March 8, 1932.  A. H. G. GIRLING  1,848,775
BRAKING MECHANISM
Filed March 28, 1929  4 Sheets-Sheet 1

A. H. G. Girling
INVENTOR

By Marks & Clerk
Attys.

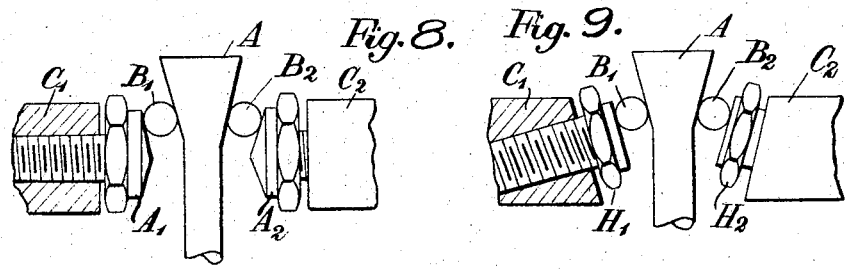
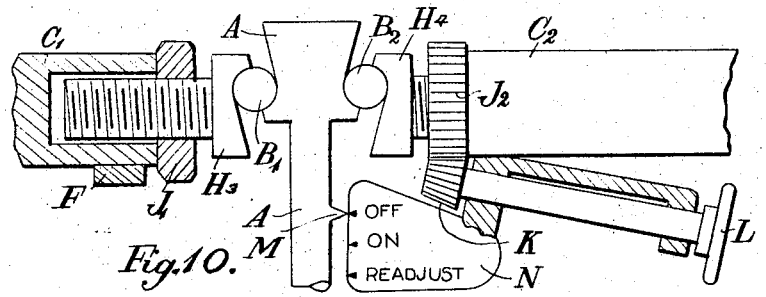
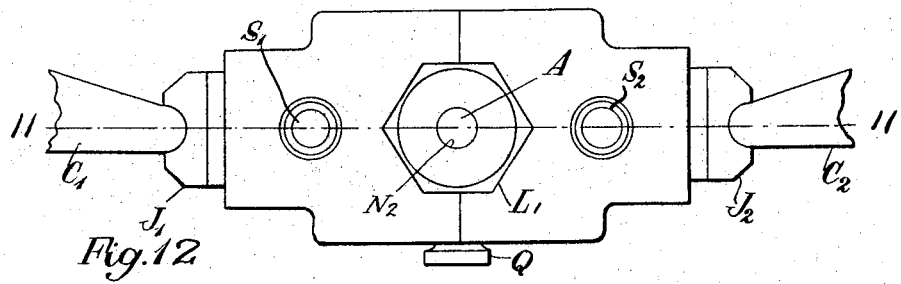
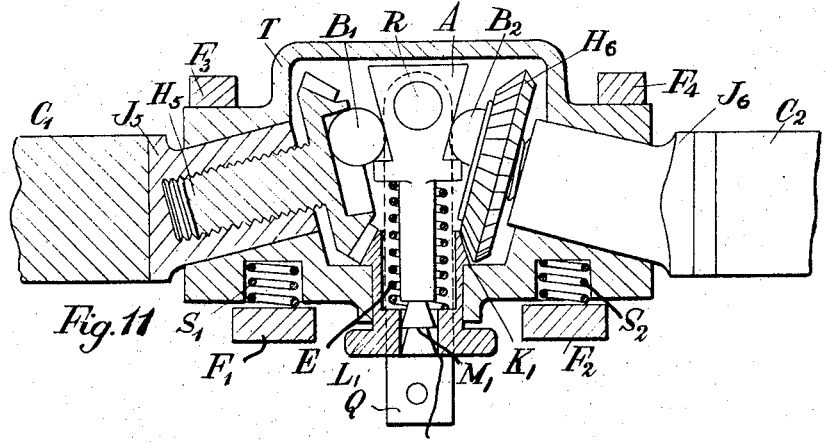

Patented Mar. 8, 1932

1,848,775

UNITED STATES PATENT OFFICE

ALBERT HENRY GODFREY GIRLING, OF HARLOW, ENGLAND

BRAKING MECHANISM

Application filed March 28, 1929, Serial No. 350,672, and in Great Britain April 5, 1928.

This invention relates to brakes for vehicles and more particularly to the means for bringing the braking element or elements into operative contact with the rotating brake drum.

In motor vehicle brakes the most widely used method of operating the brake shoes is by means of a "cam" of approximately rectangular shape placed between the movable ends of the brake shoe or shoes, this cam being attached to a "cam shaft", semi-rotation of which causes the cam to move the shoe or shoes towards the drum. This method although simple and cheap involves serious frictional losses, and an undesirable amount of distortion in the parts.

My invention obviates the above faults and possesses features in addition of great practical value not obtainable by other known constructions.

According to the invention a wedge is arranged between the ends of the braking element (or elements) said ends being formed as planes parallel to the inclined faces of the wedge, each pair of parallel surfaces being separated by, and in contact with, a rolling member, a ball or roller, or, where the load exceeds the carrying capacity of one ball or roller, a plurality of balls or rollers, the arrangement being such that when the wedge is moved endwise the rollers travel up the inclined surfaces and the resulting expansive movement displaces the ends of the braking element towards the brake drum.

In this arrangement all the contacts are rolling so there is the minimum frictional loss, distortion of the parts due to stress is small because the operative stress on the wedge is purely tensile and its magnitude may be kept small by using surfaces inclined at a small angle. Further, the heavy pressures necessary for effective braking are developed close up to the braking element, between the wedging surfaces and the rollers, the stresses involved are compressive and the parts can carry these stresses without appreciable distortion.

In some cases the central wedge is made with its two faces inclined at different angles from its axis, the surfaces on the ends of the braking element which are parallel to said faces differing in like degree, whereby one end of the braking element can be made to move at a different rate from the other end, thus allowing for a difference in the rate of wear on two braking elements.

The inclined surfaces of the braking element or elements are preferably formed on members mounted on said element or elements and adjustable for distance in relation to this element to allow for adjustment to make up for friction face wear. This is a correct method of adjustment because the only part affected is the element which carries the frictional face, wear upon which renders the adjustment necessary, the position of no other part being affected and everyone can be designed to operate at its most effective position and remains there in service.

The invention is illustrated by way of example in the accompanying drawings, in which:—

Figures 8 to 10 show two different constructional forms of the invention provided with means for adjusting the inclined surfaces of the braking element for wear.

Figures 11 to 13 show a complete expanding and adjusting unit embodying many of the features shown in the previous examples, Figure 12 being a front view, Figure 11 a section on the line 11—11 of Figure 12 and Figure 13 an end view.

Like index letters are used for like parts in all the figures.

Figure 1:
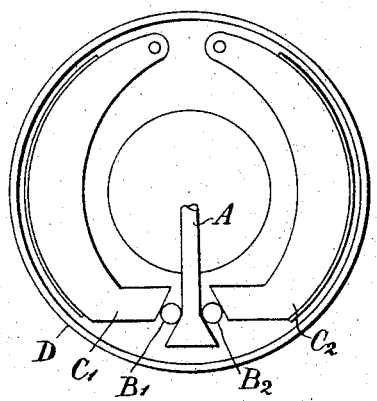
Figure 1 is a side elevation of a brake drum with braking elements which are moved radially outwardly towards the inner circumference of the brake drum by the expanding means according to the invention.

Referring to Figure 1 two braking elements or shoes C1 and C2 are expanded into braking contact with the rotating element D by the action of wedge A and rollers B1 and B2, which travel up the inclined surfaces of the wedge A and those on the ends of the shoes C1 and C2 when the wedge A is displaced axially. The control parts are shown in the same plane as the braking elements.

When fitted to control the brakes in the steerable wheels of a motor vehicle the wedge can conveniently be arranged so as to be perpendicular to the plane containing the brake, i. e. its axis will be parallel to the wheel axle, the wedge being controlled by a rod placed parallel to the axle and connected to the wedge by a vertical pivot as nearly as possible co-axial with the pivot about which the steerable wheel is deflected for steering purposes.

When placed as above described the pull on the rods tends to pull the braking element or expander casing towards the central line of the car, and an abutment must be provided preferably between the casing and some stationary part such as the dust excluding cover.

Figure 2:
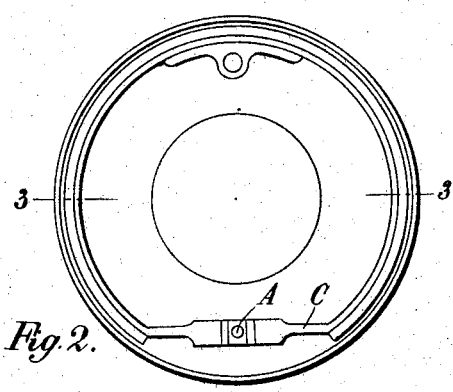
Figure 2 is a side elevation of a brake drum with a single braking element which is expanded by means of an expanding member arranged at right angles to the postion of the expanding means shown in Figure 1, Figure 3 being a section on the line 3—3 of Figure 2.
Figure 3:
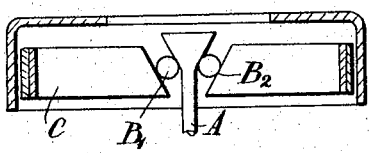

In Figures 2 and 3 is shown a single braking element C of the expanding strap type provided with my control parts placed perpendicularly to the plane containing the braking elements.

Under some conditions it may be desirable to move the braking element rapidly into contact with the brake drum, and then to reduce the rate of movement to obtain increased pressure between the frictional faces. This may be accomplished by making each wedging surface with two inclines, one steep and the other flatter, or the rollers or balls may lie in notches or grooves in the wedges, from which they must lift before traversing the inclined planes.

Figure 4:
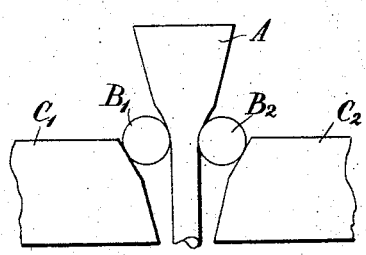
Figures 4 to 6 show various modifications of the wedge-shaped expanding member and rolling members.

Figure 4 shows the central wedge and the inclined surfaces parallel thereto made with two inclines, one steep to take up the clearance between the frictional faces rapidly, and the other one flatter to develop a heavy pressure between the frictional faces.

Figure 5:
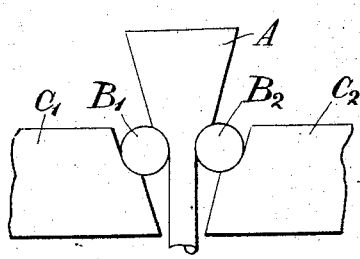

Figure 5 shows how the rollers may lie in grooves or be compelled to surmount steps on the inclined planes to give a quick initial lift.

Where a simplified arrangement is required, I may place a central wedge with surfaces of double incline or notched or grooved as above described to act directly upon rollers carried on pivots attached to the ends of the braking element.

Figure 6:
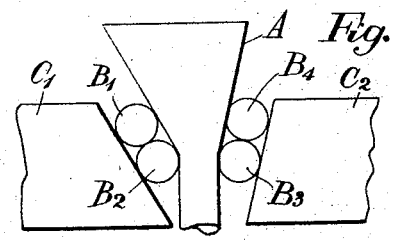

Figure 6 shows a central wedge having a steep incline on one side and a flatter incline on the other side. In this construction C1 is moved through a greater distance than C2. The figure also shows how a multiplicity of rollers or balls can be incorporated.

When the brake is released the balls or rollers should come back to stops which hold them in a definite location ready for the next brake application, and a special spring may be provided to ensure the parts coming back to their definite position of rest.

Figure 7:
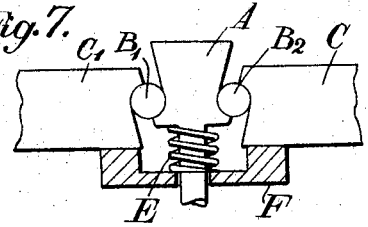
Figure 7 shows a constructional form in which the rolling members are located in definite positions when the expanding member is in its inoperative position.

Figure 7 shows how the rollers can be located in definite positions when the wedge returns to its off position, and how a spring E acting against a fixed abutment F may be used to compel the wedge to return to its off position.

The means for adjustment may be of any convenient type, for instance one or both of the inclined surfaces carried by the braking element may be formed with a threaded portion to screw into the ends of the element, being screwed into the element to a greater or lesser degree as required; or the threaded part of the inclined surface may be screwed into a nut, rotation of which causes it to move into or out of the braking element as required.

Figure 8 shows how the parallel inclined surfaces may be obtained by forming cones on the edges of two plugs A1 and A2 screwed into the ends of the braking element, adjustment being possible by rotation of the nut formation on H1 and H2.

The inclined surfaces may be formed as part of a telescopic strut placed between the roller which bears on the central wedge and the end of the braking element, the length of this telescopic member being alterable at will by any convenient means.

Figure 9 shows how the parallel inclined surfaces may be obtained by using inclined struts screwed into the braking element for adjustment purposes.

Figure 10 shows another form of adjustment. Here rotation of the nuts J1 and J2 will move the wedges H3 and H4 endwise.

The nut may be rotated directly, or indirectly by means of a worm wheel or cog wheel meshing with teeth cut on its periphery, outside means being provided for rotating the worm wheel or cog.

More accessible adjustment is provided by a small cog K meshing with teeth cut on the periphery of J2, said cog being rotated by an outside hand wheel L.

To ensure accurate and equal setting of a multiplicity of brakes, for instance the four wheel brakes of a motor vehicle, it is preferable to place a mark or pointer on the central wedge (or some part moving in harmony with the wedge) which will come opposite to marks on a stationary part, indicating when the brake is at its "off" position—the desired wedge travel when the adjustment is correct—and how far the wedge actually travels before and after adjustment. As friction face wear develops the marks will show how the wedge travel is increasing and when adjustment must be made, it will now only be necessary to adjust until the marks on all the brakes come opposite their correct corresponding marks when the pedal or brake lever is depressed, to ensure that each brake and every control part is working at its most efficient position; this eliminates the necessity for skill and the tedious test and retest methods usually required.

Figure 10 shows a pointer M on the central wedge rod, which serves to indicate the state of adjustment—and to facilitate re-adjustment by its movement in relation to the scale N.

In some cases the end of the braking element and the expanding mechanism is allowed to swing freely as a whole within the limits imposed by the brake drum, in which case it is only essential to adjust one of the inclined surfaces to compensate fully for all friction face wear.

Since all the contacts under stress are of a rolling nature lubrication is not essential, except to prevent rust, but it is of advantage to encase the parts to exclude dirt and other harmful elements, and to pack this casing with grease to prevent rust, or the parts could be made from rustless or rustproof materials. Where necessary the parts must be hardened.

In some cases the casing would be free to locate itself between the ends of the braking elements, in others it would be held frictionally so that it could locate itself under stress but would not move when the brake was off, and in some instances the casing would be fixed or formed as part of a fixed member. In the latter cases there might be side stresses developed between the central wedge and the casing and to prevent friction balls, rollers or small pivoted rollers could be interposed.

Figure 13:
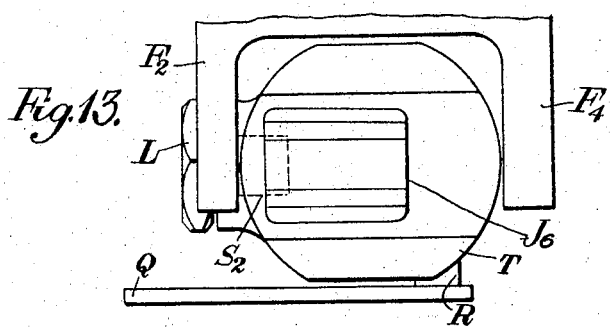
Figure 14:
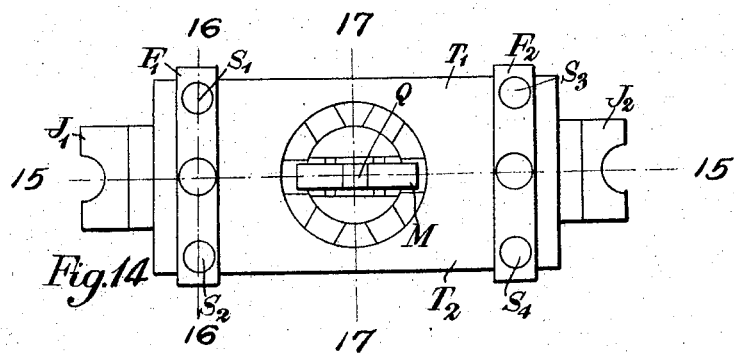
Figure 14 is a front view of a further modification.
Figure 15:
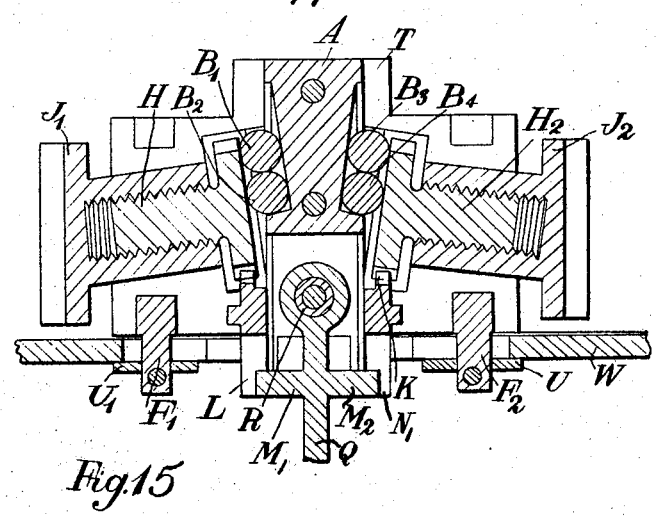
Figure 15 is a section on the line 15—15 of Figure 14.
Figure 16:
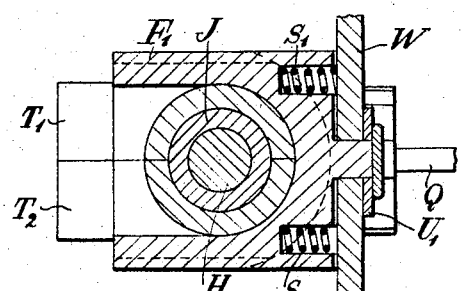
Figure 16 is a section on the line 16—16 of Figure 14.
Figure 17:
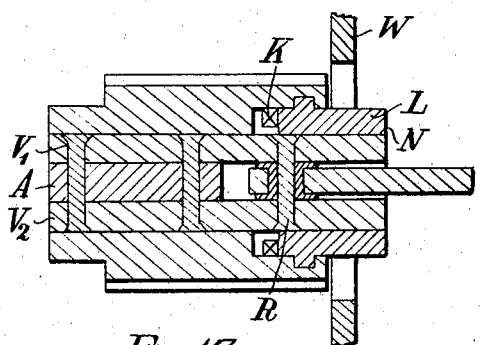
Figure 17 is a section on the line 17—17 of Figure 14.

In the complete expanding and adjusting unit shown in Figures 11 to 13, the central wedge A is operated by the rod or strap Q which is formed with a vertical pivot R, engaging with A in such a way as to allow for the deflection of the brake when attached to a steerable wheel. Rollers B1 and B2 separate the central wedge from the parallel inclined surfaces, stops on the four inclined surfaces serve to locate the rollers in their off position, and spring E brings all parts to their correct off position. The parallel inclined surfaces are formed on adustable plugs H5 and H6, rotation of which in the nuts J5 and J6 serve to adjust for friction face wear, the plugs are adjustable simultaneously, being formed with bevel teeth that mesh with the central adjuster K1, the latter being formed with an external nut L1. An adjustment indicator is provided: when the brake is off the visible end of A is flush with the surface N2, when the brake—correctly adjusted—is applied the groove M1 comes flush with N2, as wear occurs M1 comes out beyond N, and when adjustment is needed the nut L is rotated until, with the brake on, M1 is again flush with N2. The parts are contained in a dust-excluding casing T which encloses the mechanism and is adapted to move freely with the ends of the braking elements. The reaction of the pull on the rod Q is taken by fixed abutments $F_1$ and $F_2$ (omitted from Figure 12) for preventing the casing from following the movements of the wedge during the application of the brake. When it is desired to hold the casing frictionally so as to enable it to locate itself under stress, further abutments $F_3$ and $F_4$ are provided, arranged in proximity to the side of the casing remote from the abutments $F_1$, $F_2$, and frictional restraining means comprising springs $S_1$ and $S_2$ which engage the casing and force it hard up to the abutments $F_3$, $F_4$, thereby locating the casing definitely when the wedge is in the inoperative position. On a pull being exerted on the rod Q sufficient to overcome the force of the springs $S_1$, $S_2$, the bearing pressure acting between the casing and the abutments $F_3$, $F_4$ is reduced, thereby allowing the casing to slide more freely to the position determined by the stresses developed by application of the brake.

Referring to Figures 14 to 17 the central wedge A is riveted between guide pieces V1, V2 and is operated by a link Q free to swing about a pivot R to allow for deflection when fitted to the steerable wheel of a vehicle. Endwise movement of A causes rollers B1, B2, B3, B4 to operate against the heads of the inclined struts H1, H2 so as to expand the brake shoes into operative contact with the brake drum, the struts H1, H2 are provided with teeth at K which are in mesh with corresponding teeth on the central adjuster L, rotation of the latter causes H1 and H2 to screw or unscrew from the contact pieces J1, J2 and by this means to adjust the clearance between the frictional faces of the brake correctly. Inadvertent rotation of L is prevented by the wings M1 and M2 engaging with the castellations on L.

Brake adjustment is effected by first applying the brake gently to withdraw the wings M from L and to hold the friction faces in light contact. Rotation of L in the correct direction then causes M1 and M2 to approach the ends of the castellations at N, as soon as these parts come into contact, further adjustment, is prevented. This device provides a visible indication of the state of adjustment and a limit beyond which it cannot be carried, and the movement of M1, M2 into the castellations not only locks L but also ensures exactly the correct working clearance betwen the frictional faces so that the equal and accurate adjustment of a multiplicity of brakes becomes an operation demanding no skill.

To facilitate adjustment still further the pedal or operating lever can be held in its operative position during adjustment by a spring just strong enough to bring the braking elements into contact with the brake drums, it will now only be necessary to adjust each brake so the indicating marks correspond to ensure perfect results.

Figure 18:
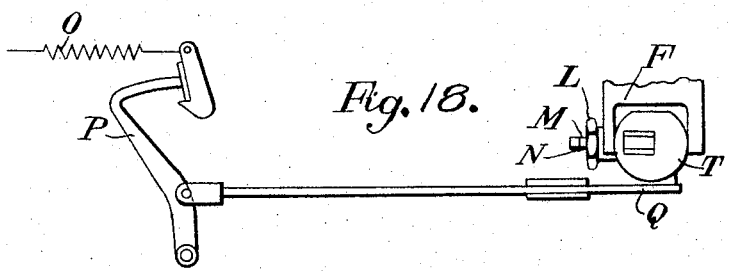
Figure 18 is a diagrammatic view showing how the construction shown in Figures 11 to 13 can be adjusted.

Figure 18 shows how by using a spring O hooked on to the pedal and brakes may be applied gently, exposing M, and by rotation of L enable re-adjustment to be very easily affected.

Whilst intended more particularly for use where the braking elements move outwards radially towards the inner circumference of the brakedrum, it may be applied to any kind of brake, or may be used to operate the parts of a brake through intermediate levers or the like.

There are many ways in which my invention may be applied, and constructions would naturally be developed to meet special circumstances and as experience accumulated.

What I claim is:—

1. A brake actuating mechanism, comprising the combination with an element to be braked and a braking element therefor, of expanding means for bringing said braking element into operative contact with the element to be braked, and comprising inclined surfaces on the braking element, a wedge centrally placed between said inclined surfaces and movable endwise, the inclined surfaces of the braking element being parallel to the adjacent faces of the said wedge, and an antifriction rolling member interposed between each pair of parallel surfaces, said member being arranged so as to be free to roll over both surfaces of the pair of parallel surfaces, as and for the purposes set forth.

2. A brake actuating mechanism, comprising the combination with an element to be braked and a braking element therefor, of expanding means for bringing said braking element into operative contact with the element to be braked and comprising an inclined wedge movable endwise, expanding means on the braking element on each side of said wedge, said expanding means comprising at least one expanding member having a surface parallel to the adjacent face of the wedge, said member being adjustable on the braking element with respect to the said face, and antifriction devices interposed between the faces of the wedge and the said expanding means, as and for the purposes set forth.

3. A brake actuating mechanism, comprising the combination with an element to be braked and a braking element therefor, of expanding means for bringing said braking element into operative contact with the element to be braked, and comprising an inclined wedge movable endwise, expanding means on the braking element on each side of said wedge, at least one of said expanding means comprising a plug screwed into the braking element and having a flat end adjacent the wedge, said plug being inclined with respect to the wedge with its flat end parallel to the adjacent face of the wedge, and an antifriction device interposed between said flat end and the adjacent face of the wedge, as and for the purposes set forth.

4. A brake actuating mechanism, comprising the combination with an element to be braked and a braking element therefor, of expanding means for bringing said braking element into operative contact with the element to be braked and comprising an inclined wedge movable endwise, expanding means on the braking element, on each side of said wedge, at least one of said expanding means comprising a nut interposed between the wedge and the end of the braking element, a plug screwed into said nut so as to form therewith an adjustable telescopic strut intermediate the wedge and the end of the braking element, said plug having a surface adjacent to and parallel to one face of the wedge, and an antifriction device interposed between said surface and the adjacent face of the wedge, as and for the purposes set forth.

5. A brake actuating mechanism as set forth in claim 2, comprising means operatively connected to the adjustable expanding member and arranged externally of the brake assembly for adjusting said member.

6. A brake actuating mechanism as set forth in claim 3, comprising a gear wheel fixed on the screwed plug, a gear member engaging said gear wheel and means actuatable by hand arranged externally of the brake assembly and operatively connected to said gear member for adjusting said plug with respect to the wedge.

7. A brake actuating mechanism as set forth in claim 1, having stops on the inclined surfaces to locate the antifriction devices positively in the inoperative position of the wedge.

8. A brake actuating mechanism as set forth in claim 1, having stops on the inclined surfaces to locate the antifriction devices positively in the inoperative position of the wedge, a spring in engagement with said wedge so as to urge the wedge into the inoperative position and an abutment for said spring, as and for the purposes set forth.

9. A brake actuating mechanism as set forth in claim 1, having a dirt excluding casing enclosing the mechanism and adapted to move freely with the ends of the braking element and a fixed abutment for preventing the casing from following the movements of the wedge.

10. A brake actuating mechanism as set forth in claim 1, having a dirt excluding casing enclosing the mechanism and adapted to move freely with the ends of the braking element and a fixed abutment for preventing the casing from following the movements of the wedge during the application of the brake, frictional restraining means in engagement with the casing so as to enable the casing to locate itself under stress, said restraining means being adapted to locate the casing definitely when the wedge is in the inoperative position.

11. A brake actuating mechanism as set forth in claim 1, having a dirt excluding casing enclosing the mechanism, a fixed abutment adapted to engage the casing for preventing the latter from following the movement of the wedge during the application of the brake, a second fixed abutment arranged in proximity to the side of the casing remote from the said first-mentioned abutment, said casing being adapted to move freely between said abutments and a spring interposed between said first mentioned abutment and the casing so as to urge the casing towards said second mentioned abutment, as and for the purposes set forth.

12. A brake actuating mechanism as set forth in claim 1, having indicating means connected to the wedge for indicating the position of the wedge in the "on" and "off" positions of the brakes, as and for the purposes set forth.

In testimony whereof I have signed my name to this specification.

ALBERT HENRY GODFREY GIRLING.